United States Patent
Talbot (10) Patent No.: US 10,701,312 B1
(45) Date of Patent: Jun. 30, 2020

(54) METHOD AND SYSTEM FOR POST-CALL REDIRECTION OF VIDEO RELAY SERVICE CALLS AND DIRECT VIDEO CALLS

(71) Applicant: Chris Talbot, Moorpark, CA (US)

(72) Inventor: Chris Talbot, Moorpark, CA (US)

(*) Notice: Subject to any disclaimer, the term of this patent is extended or adjusted under 35 U.S.C. 154(b) by 0 days.

(21) Appl. No.: 16/253,453

(22) Filed: Jan. 22, 2019

(51) Int. Cl.
| | |
|---|---|
| *H04N 7/14* | (2006.01) |
| *H04M 3/42* | (2006.01) |
| *G09B 21/00* | (2006.01) |
| *H04M 3/51* | (2006.01) |
| *H04M 3/58* | (2006.01) |

(52) U.S. Cl.
CPC ........... *H04N 7/147* (2013.01); *G09B 21/009* (2013.01); *H04M 3/42391* (2013.01); *H04M 3/5166* (2013.01); *H04M 3/5183* (2013.01); *H04M 3/58* (2013.01)

(58) Field of Classification Search
CPC combination set(s) only.
See application file for complete search history.

(56) References Cited

U.S. PATENT DOCUMENTS

| | | | |
|---|---|---|---|
| 2017/0026518 A1* | 1/2017 | Averill | H04M 3/5183 |
| 2017/0155762 A1* | 6/2017 | Hamling | H04N 7/147 |

* cited by examiner

*Primary Examiner* — Phung-Hoang J Nguyen
(74) *Attorney, Agent, or Firm* — Scheinberg & Associates, PC; John B. Kelly (57) ABSTRACT

A video calling system, method, and computer-readable medium for post-call redirection comprising the steps of initiating a video call between at least two call participants, wherein at least one of the call participants is deaf, hard-of-hearing, or speech impaired; enabling post-call redirection for the video call; determining when the video call ends; and, in response to determining that the first video call has ended, redirecting at least one of the call participants to a post-call destination.

18 Claims, 5 Drawing Sheets

METHOD AND SYSTEM FOR POST-CALL REDIRECTION OF VIDEO RELAY SERVICE CALLS AND DIRECT VIDEO CALLS

TECHNICAL FIELD

The present invention relates to telecommunications services for callers who are deaf, hard-of-hearing, or speech impaired (D-HOH-SI).

BACKGROUND

Traditional telephony can be difficult or impossible for persons who are who are deaf, hard of hearing, or speech-impaired (D-HOH-SI). Communication by telephone requires each party to a telephone call to be able to hear and/or speak to the other party on the call with sufficient fidelity to communicate. For hearing or speech impaired persons, audio communication with sufficient fidelity is difficult or impossible, making telephone communication difficult or impossible.

Early approaches to facilitating telecommunications for D-HOH-SI persons included text-based telecommunications relay service (TRS). Text-based TRS services allow a D-HOH-SI person to communicate with other people over an existing telecommunications network using devices capable of transmitting and receiving text characters over the telecommunications network. Such devices include the telecommunications device for the deaf (TDD) and the teletypewriter (TTY). Text-based TRS services were well-suited to the bandwidth limitations of subscriber lines of the time. The bandwidth limitations of subscriber lines were also a limiting factor in the widespread use of video telephony.

The availability of affordable, high-speed packet-switched communications has led to the growth in the use of Video Relay Service (VRS) communication by D-HOH-SI persons. Using VRS equipment, D-HOH-SI persons may place video calls to communicate between themselves and hearing individuals (non-D-HOH-SI) using sign language (SL). VRS equipment enables D-HOH-SI persons to talk to hearing individuals via a sign language interpreter (SLI), who uses a conventional telephone at the same time to communicate with the party or parties with whom the D-HOH-SI person wants to communicate.

Direct Video Calling (DVC) is an emerging telecommunications service for one-to-one video communication provided by a call center that allows conversations to occur between two participants in a call using American Sign Language (ASL) without the need for translation services. DVC is a support service that enables customer service representatives who know American Sign Language (ASL) to communicate directly with D-HOH-SI people who rely on ASL as their primary language without the need for an intermediary to relay these conversations. With DVC, a D-HOH-SI person can use ASL and a videophone with a real-time video connection to make a call directly to an ASL-trained agent within a call center. DVC solutions have been adopted by a variety of government agencies and private corporations, and the number continues to grow.

SUMMARY OF THE INVENTION

An embodiment of the present invention is directed to a method in a video calling system for post-call redirection. The method includes initiating a video call between at least two call participants, wherein at least one of the call participants is deaf, hard-of-hearing, or speech impaired; enabling post-call redirection for the video call; determining when the video call ends; and, in response to determining that the first video call has ended, redirecting at least one of the call participants to a post-call destination.

Another embodiment of the present invention is directed to a video calling system adapted for post-call redirection. The system includes a computer processor coupled to a computer bus; a network adapter coupled to the computer bus, the network adapter adapted to send and receive data over a telecommunications network; a computer memory coupled to the computer bus. The computer memory is programmed with computer-executable instructions that, when executed by the computer processor, cause the video calling system to perform the steps of initiating a video call between at least two call participants, wherein at least one of the call participants is deaf, hard-of-hearing, or speech impaired; enabling post-call redirection for the video call; determining when the video call ends; in response to determining that the video call has ended, redirecting at least one of the call participants to a post-call destination.

Another embodiment of the present invention is directed to a non-transitory computer-readable medium encoded with computer instructions that, when executed by a computer processor of a video calling system, cause the video calling system to perform the steps of initiating a video call between at least two call participants wherein at least one of the call participants is deaf, hard-of-hearing, or speech impaired; enabling post-call redirection for the video call; determining when the video call ends; in response to determining that the video call has ended, redirecting at least one of the call participants to a post-call destination.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION

Embodiments of the present invention are directed to methods and system for redirecting Video Relay Service (VRS) calls and Direct Video Calling (DVC) calls so that a second call or other post-call action can be taken while one or more parties to the call are available. That is, in a VRS or DVC call between a calling party and a called party, both the calling party and the called party can be redirected to a second call or other post-call action. The post-call redirection can be automatic. Alternatively, each party can be prompted for post-call redirection. Post-call redirection can be enabled any point during the call.

Figure 1:
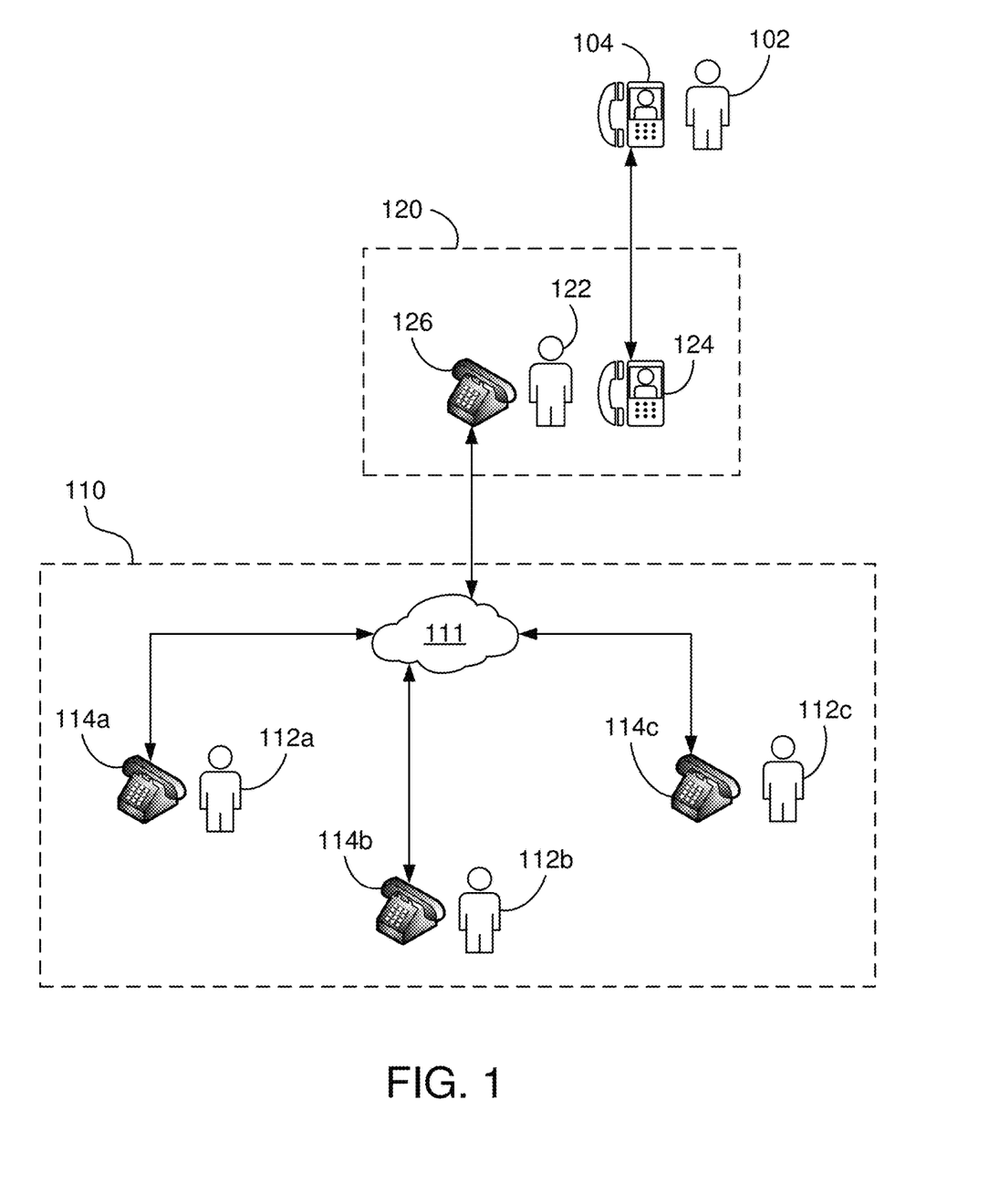
FIG. 1 shows an exemplary Video Relay Service (VRS) system.

FIG. 1 shows an exemplary Video Relay Service (VRS) system. Calling party 102 is deaf, hard-of-hearing, or speech impaired (D-HOH-SI). Calling party 102 uses videophone 104 to place a video call to VRS service provider 120. Videophone 104 can be any device that is capable of sending and receiving video signals with sufficient fidelity suitable for video telephony. For example, videophone 104 can comprise discrete components such as a display, video camera, and transceiver coupled together in an application-specific solution. Videophone 104 can also comprise a network-connected computer, smartphone, or tablet executing a software application that enables video telephony. The video call can be made over any network suitable for video telephony including, but not limited to, packet switched networks, such as the Internet, and the public switched telephone network (PSTN). Videophone 104 can communicate with other devices on the network using any means suitable for video telephony including, but not limited to, voice over internet protocol (VOIP), session-initiated protocol (SIP), H.323 standard from the International Telecommunication Union Telecommunication Standardization Sector (ITU-T), and the like.

VRS provider 120 includes one or more human sign language interpreters (SLI) 122 who are fluent in one or more sign languages, such as American Sign Language (ASL). Sign language interpreter 122 receives the video call on video phone 124 from calling party 102. Sign language interpreter 122 places a traditional audio telephone call using telephone 126 via the public switched telephone network (PSTN) to organization 110. Organization 110 can be a business, government entity, or any organization that operates a customer service call center. The audio call can be routed through switchboard 111 to the telephone 114 a-c of the next available of customer service agents 112 a-c. For example, assume customer service agent 112a is the next available customer service agent. Customer service agent 112a and sign language interpreter 122 speak to each other via telephones 114a and 126. Sign language interpreter 122 and D-HOH-SI calling party 102 sign to each other via video phones 124 and 104. In this way, sign language interpreter 122 serves as an intermediary translating spoken language into sign language and relaying the conversation between calling party 102 and customer service agent 112a.

For example, a D-HOH-SI calling party needs to call his bank. The calling party initiates a VRS call with an SLI associated with a VRS service provider. The SLI places a telephone call to the bank's customer service department. A customer service agent at the bank answers the phone in accordance with known telephone communications between hearing parties. The SLI speaks on the phone with the customer service agent and signs to the D-HOH-SI calling party by way of the VRS. In this way, the SLI acts as an intermediary between the D-HOH-SI calling party via VRS and the hearing called party via the public switched telephone network.

Figure 2:
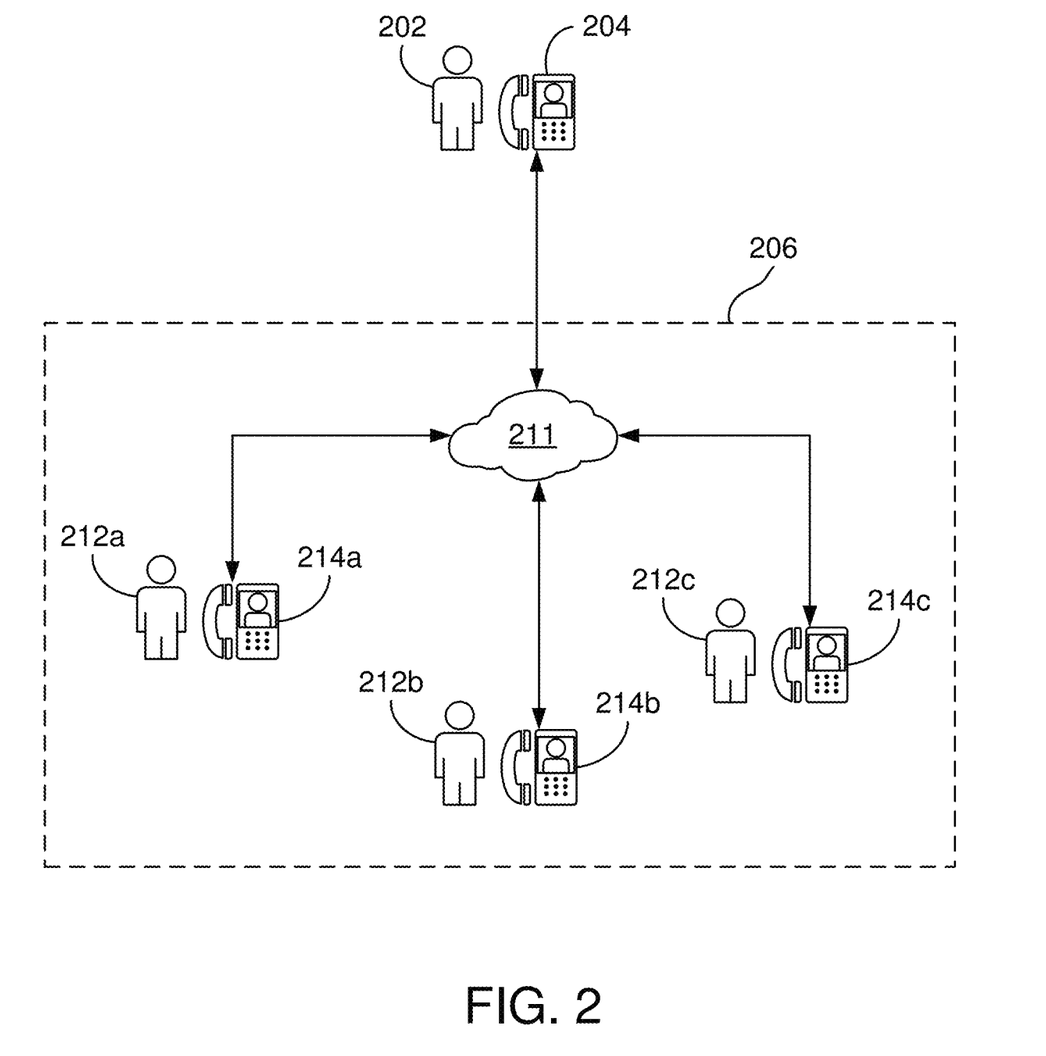
FIG. 2 shows an exemplary Direct Video Calling (DVC) system.

FIG. 2 shows an exemplary Direct Video Calling (DVC) system. D-HOH-SI calling party 202 uses videophone 204 to place a DVC call to organization 206. Organization 206 can be a business, government entity, or any organization that operates a customer service call center. Organization 206 operates a call center that supports direct video calling. The DVC video call can be routed through switchboard 211 to the videophone 214 a-c of the next available of customer service agents 212 a-c. For example, assume customer service agent 212a is the next available customer service agent. Customer service agent 212a and D-HOH-SI calling party 202 are connected by way of a DVC video call. Customer service agent 212a and D-HOH-SI calling party 202 are able to sign to each other via video phones 214a and 204. In this way, customer service agent 212a and calling party 202 can communicate via sign language without an intermediary translating spoken language into sign language and relaying the conversation between calling party 202 and customer service agent 112a.

Figure 3:
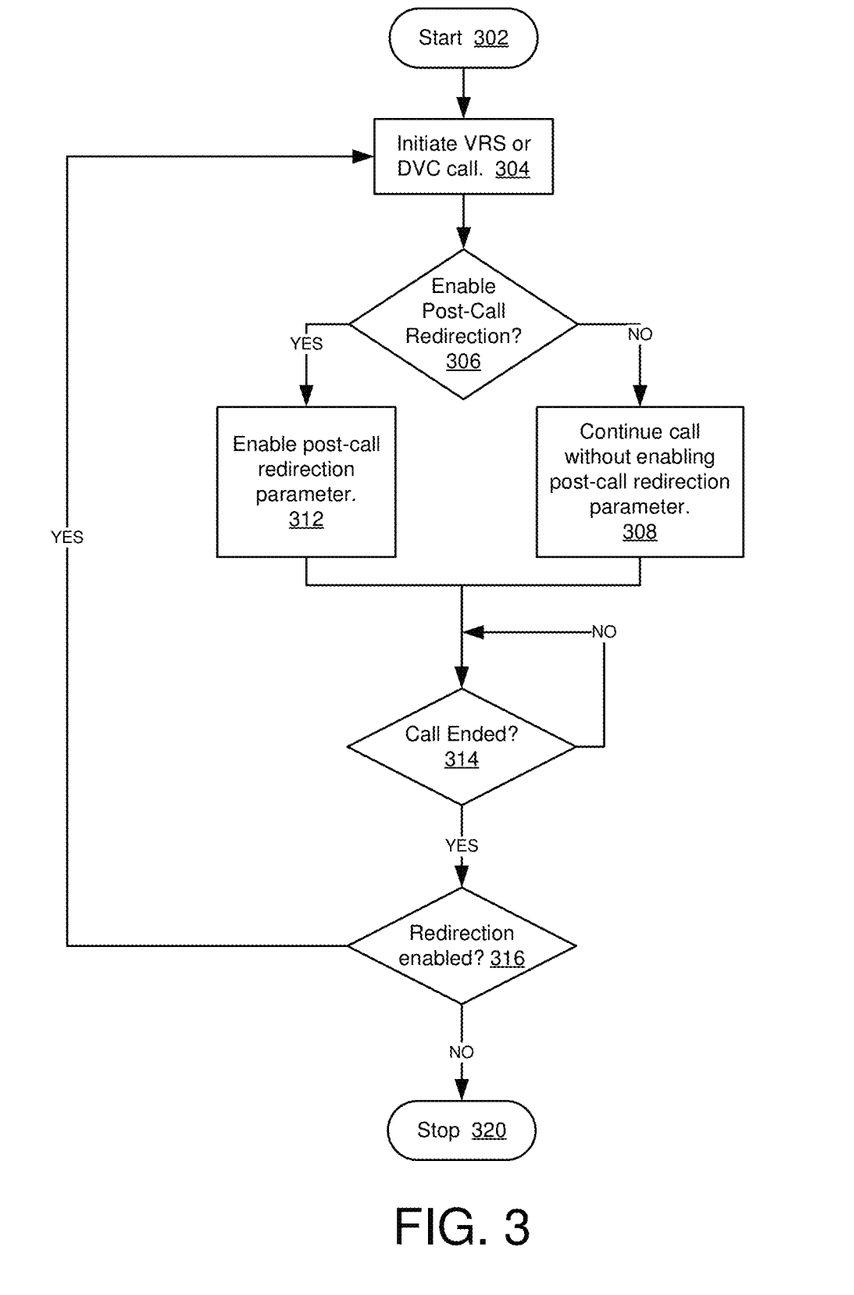
FIG. 3 shows a method for post-call redirection of a VRS or DVC video phone call in accordance with one or more embodiments of the present invention.

FIG. 3 shows a method for redirecting a VRS or DVC phone call in accordance with one or more embodiments of the present invention. The process begins at 302. At step 304, the system begins to initiate a VRS or DVC call. As part of initiating the call, the system can determine whether post-call redirection should be enabled (step 306). For example, the calling party may use videophone equipment/software from a VRS provider to make video calls. The VRS provider may set a rule that all DVC calls originating from its equipment/software have post-call redirection enabled so that the call returns to the VRS provider after the DVC call is complete. While the above description associated with FIG. 3 describes post-call redirection being enabled as part of initiating the call, it should be recognized that post-call redirection may be enabled anywhere in the call path (e.g., at the start of the call, anywhere in the middle, or at the destination of the call).

If the call is to be redirected at the end of the call, post-call redirection is enabled (step 312). Post-call redirection can be enabled, for example, by means of a call parameter used to initiate the VRS or DVC call (i.e., the post-call redirection parameter). The post-call redirection parameter can be set to indicate that one or more of the participants in the call should be redirected to initiate a second VRS or DVC call upon completion of the first call. The post-call redirection parameter can also be set to indicate the destination to which the call should be redirected. If the call is not to be redirected at the end of the call, the call continues without enabling post-call redirection (step 308). For example, the call can continue without enabling the post-call redirection parameter.

After the call is initiated, the system monitors the call and detects when the call ends (step 314). The system then determines whether post-call redirection was enabled for one or more of the call participants (step 316). For example, the system can check to see whether the post-call redirection parameter was enabled when the call was initiated, during the call, or at the destination of the call. If post-call redirection was not enabled, then the process ends at termination block 320. If post-call redirection was enabled, then the process returns to step 304 where a second VRS or DVC call is automatically initiated for either or both of the participants in the call, or where either or both of the participants in the call are prompted to make a second VRS or DVC call. The post-call redirection parameter can include destination routing information so that one or more of the participants in the call is returned to step 304 for a second VRS or DVC call. The one or more participants of the first call can be prompted for more information to complete the second call. The second VRS or DVC call is one type of a post-call destination.

The first call and the second call can be any combination of VRS or DVC calls. For example, a D-HOH-SI calling party wants to pay a utility bill by phone, but first wants to see if a recent deposit has cleared his checking account. The calling party places a Direct Video Call to his bank, which has a call center that supports direct video calling. To place the call, the calling party uses a videophone system supplied by a VRS provider. When the DVC call between the calling party and the bank is initiated, the VRS service provider can enable post-call redirection by enabling a post-call redirection parameter when the call with the bank is initiated. Enabling the post-call redirection parameter can be used to ensure that the call will be returned to the VRS provider after the DVC call with the bank is concluded. Enabling the post-call redirection parameter and returning the call to the VRS provider can be done transparently. When the DVC call with the bank is concluded, the calling party can then be asked by the VRS provider whether the calling party would like to make another call. This time the calling party makes a VRS call to the utility company, which does not have a call center supporting Direct Video Calling. Calling party makes the utility payment by phone using VRS service.

Post-call redirection is not limited to making subsequent VRS or DVC calls. Post-call redirection can be used for any number of complementary post-call destinations, such as surveys, special offers, prompts for calls to related services, prompts for services offered by paid customers of a VRS provider, etc. For example, post-call redirection can be used for post-call surveys such as customer satisfaction surveys.

Figure 4:
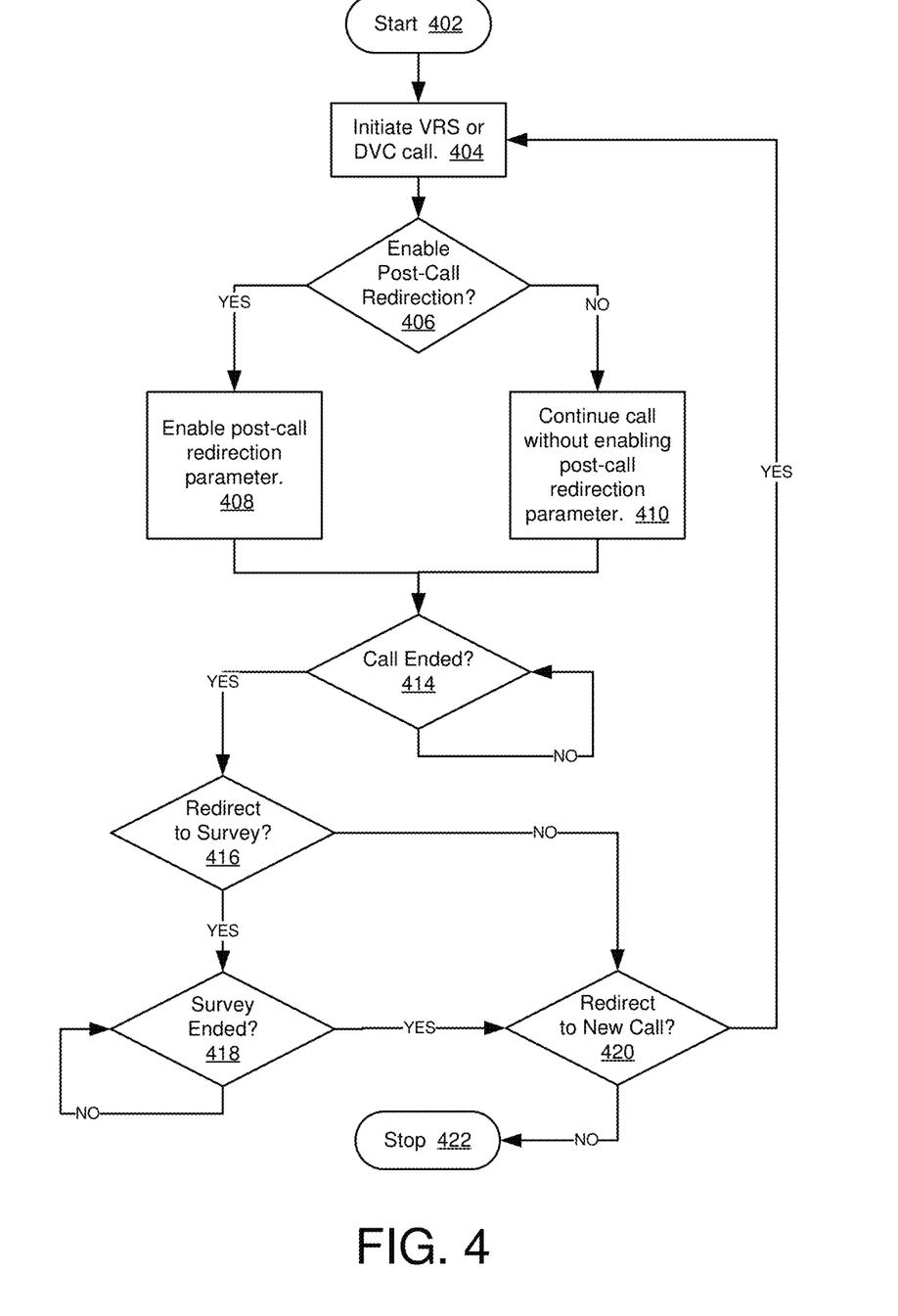
FIG. 4 shows a method for redirecting a VRS or DVC video phone call that can include post-call surveys.

FIG. 4 shows a method for redirecting a VRS or DVC phone call that can include post-call surveys. The process begins at 402. At step 404, the system begins to initiate a VRS or DVC call. As part of initiating the call, the system can determine whether post-call redirection should be enabled (step 406). For example, the calling party may use videophone equipment/software from a VRS provider to make video calls. The VRS provider may provide a service to called parties that redirects VRS and DVC calling parties to a customer satisfaction survey after a call with the called party ends. The VRS provider may set a rule that calls initiated with called parties who subscribe to a survey service have post-call redirection enabled so that the call returns to the VRS provider for a survey after the initial call is complete. While the above description associated with FIG. 4 describes post-call redirection being enabled as part of initiating the call, it should be recognized that post-call redirection may be enabled anywhere in the call path (e.g., at the start of the call, anywhere in the middle, or at the destination of the call).

If the call is to be redirected at the end of the call, post-call redirection is enabled when initiating the call (step 408). Post-call redirection can be enabled, for example, by means of a call parameter used to initiate the VRS or DVC call (the post-call redirection parameter). The post-call redirection parameter can be set to indicate that one or more of the participants in the call should be redirected to a post call destination upon completion of the call. The post-call redirection parameter can also be set to indicate the destination to which the call should be redirected. The post-call redirection parameter can also be set to indicate what type of redirection should occur (e.g., new call, survey, etc.). If the call is not to be redirected at the end of the call, the call continues without enabling post-call redirection (step 410). For example, the call can continue without enabling the post-call redirection parameter.

After the call is initiated, the system monitors the call and detects when the call ends (step 414). The system then determines what type of post-call direction should occur. In this example, the system first checks to see if one or more of the call participants should be redirected to a survey (step 416). For example, the system can check whether the post-call redirection parameter indicates that one or more of the call participants should be redirected to a survey. If there is no post-call redirection parameter indicating that a call participant should be redirected to a survey, then the process proceeds to step 420. If there is a post-call redirection parameter indicating that one or more of the call participants should be redirected to a survey, then the one or more call participants is redirected to a survey in accordance with the post-call redirection parameter. The survey is another type of post-call destination. The post-call redirection parameter can include destination routing information, if necessary, to route the call to the system administering the survey. The survey can be administered by the VRS provider whose equipment/software one or more of the call participants is using. The survey can be presented to the call participant in a way that is suitable for a D-HOH-SI call participant. For example, if the call participant's videophone includes a touchscreen (such as a smartphone or tablet running VRS software) or a pointing device (such as a personal computer and mouse running VRS software), then the survey can be presented as text on the videophone with user-selectable options. Presenting the survey as text on the videophone with user-selectable options eliminates the need for a VRS call with a sign language interpreter to complete the survey. In another example, the survey can be presented to the call participant using an Interactive Sign Language Response (ISLR) system as described in U.S. patent application Ser. No. 16/158,284 filed on Oct. 11, 2018, by the Application of the present application and which is hereby incorporated by reference in its entirety.

After the survey is initiated, the system monitors the survey and detects when the survey ends (step 418). The system then determines whether post-call redirection was enabled for the call (step 420). For example, the system can check to see whether the post-call redirection parameter indicated that call should be redirected for a new call. If redirection was not enabled when the call was initiated, then the process ends at termination block 422. If post-call redirection was enabled when the call was initiated, then the process returns to step 304 where a second VRS or DVC call is initiated. The post-call redirection parameter can include destination routing information so that the call is returned for a second VRS or DVC call. The call participant can be prompted for more information to complete the second call.

For example, a D-HOH-SI calling party wants to order a clothing item by phone from a catalog of a retailer. The calling party places a DVC to the retailer, which has a call center that supports direct video calling. To place the call, the calling party uses a videophone system supplied by a VRS provider. When the DVC call between the calling party and the retailer is initiated, the VRS service provider can enable post-call redirection by enabling a post-call redirection parameter when the call with the retailer is initiated. Enabling the post-call redirection parameter can be used to ensure that the call will be returned to the VRS provider after the DVC call with the retailer is concluded. Enabling the post-call redirection parameter and returning the call to the VRS provider can be done transparently. When the DVC call with the retailer is concluded, the calling party can then be asked by the VRS provider whether the calling party be interested in taking a short customer satisfaction survey. The customer satisfaction survey can be a service that the retailer pays the VRS provider to provide. When the survey is complete, the calling party can then be presented with a special offer from another clothing retailer and prompted to make a call to the second clothing retailer. This time the calling party makes a VRS call to the second clothing retailer, which does not have a call center supporting Direct Video Calling.

Figure 5:
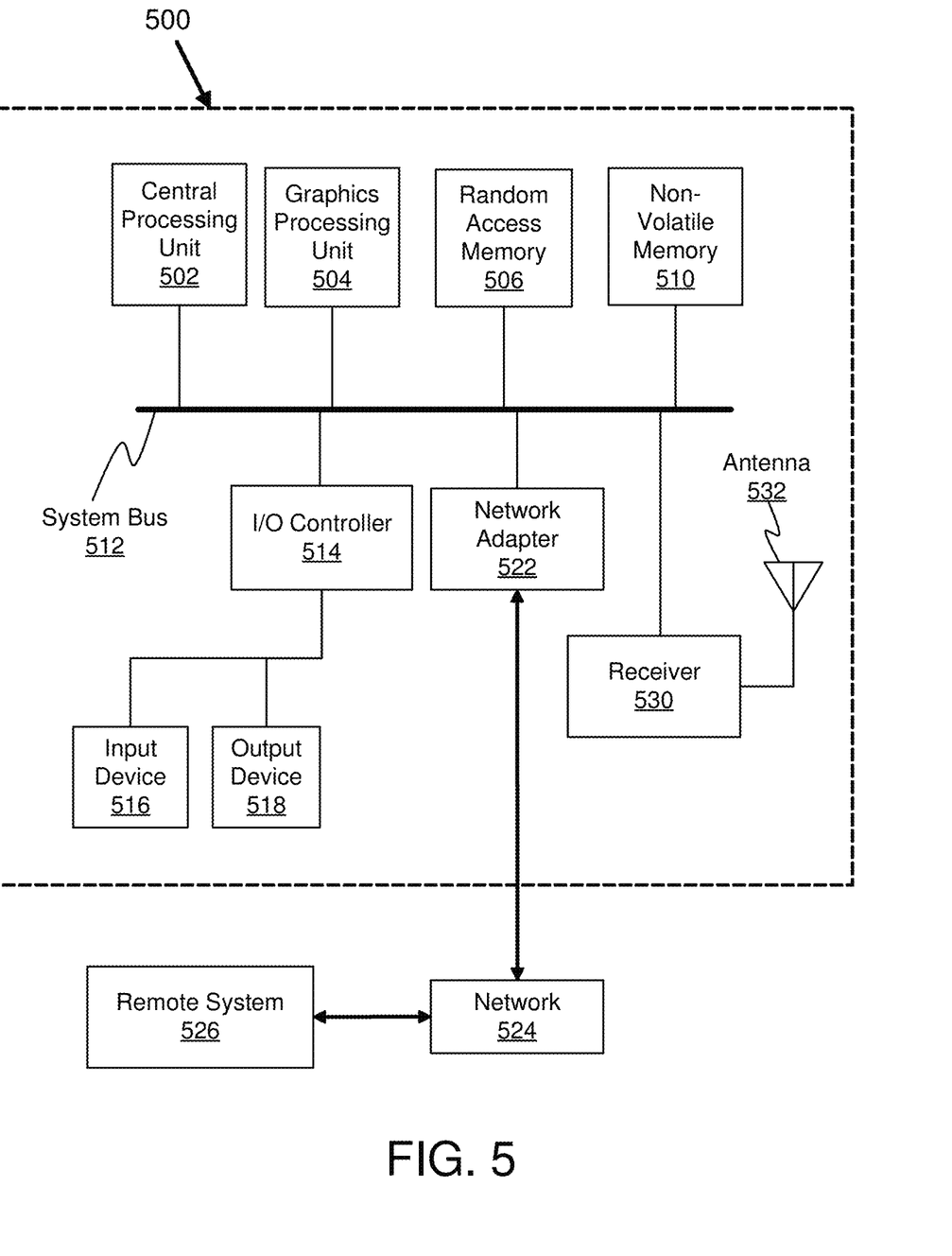
FIG. 5 shows a block diagram of an exemplary system 500 suitable for use as a system implementing one or more of the methods described above.

FIG. 5 shows a block diagram of an exemplary system 500 suitable for use as a system implementing one or more of the methods described above. System 500 includes a central processing unit 502 having at least one microprocessor. Central processing unit 502 can be coupled directly or indirectly to memory elements through system bus 512. The memory elements comprise computer-readable memory capable of storing computer-executable instructions. The memory elements can include random access memory 506 employed during the actual execution of program code and non-volatile memory 510 for longer term storage of data and instructions. One or more input devices 516 and output devices 518 can be coupled to system bus 512 either directly or through an intervening I/O controller 514. Examples of input device 516 include, but are not limited to, a pointing device, such as a mouse or a trackpad, or a keyboard. Examples of input device 516 can also include camera and a microphone for recording and transmitting video signals and audio signals. Examples of output device 518 include, but are not limited to, a display screen or a printer. Input device 516 and output device 518 can be combined into a single device comprising a touchscreen comprising a display screen (for displaying information to the user of system 500) having a touch-sensitive surface (for receiving input from the user). System 500 also includes network adapter 522 to enable the system to become coupled to remote system 526 through intervening private or public networks 524. Modems, cable modems, Ethernet cards, and wireless network adapters are just a few of the currently available types of network adapters. System 500 can include one or more receivers 530. Receiver 530 receives wireless signals via antenna 532. Receiver 530 is adapted for receiving a data signal from a transmitting device. Receiver 530 can comprise a transceiver capable of both transmitting and receiving wireless data signals. While various component devices of computer system 500 are shown as separate devices in FIG. 5 for purposes of description, various component devices may be integrated into a single device as is known in the art, such as in a system-on-a-chip (SoC) device.

Some embodiments of the present invention can comprise a computer program encoded in a computer-readable memory of system 500. The computer program comprises computer-executable instructions that, when executed, causes the interactive sign language response system to perform the steps of method described herein. System 500 can be embodied in any suitable data processing system or computer system including, but not limited to, personal computers (PC), file servers, cloud computing systems, software-as-a-service (SaaS) systems, cellular telephones, smartphones, tablet devices, laptop computers, personal digital assistants, and the like.

Although the present invention and its advantages have been described in detail, it should be understood that various changes, substitutions and alterations may be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. A method in a video calling system for post-call redirection comprising:
   connecting a video call between at least two call participants, wherein at least one of the call participants is deaf, hard-of-hearing, or speech impaired;
   determining automatically by the video calling system without any input from any of the call participants whether post-call redirection should be enabled;
   upon determining by the video calling system that post-call redirection should be enabled,
   enabling post-call redirection for the video call;
   determining when the video call ends;
   in response to determining that the video call has ended, redirecting at least one of the call participants to a post-call destination; and
   wherein redirecting at least one of the call participants to a post-call destination further comprises redirecting at least one of the call participants to the post-call destination without any input from any of the call participants.

2. The method of claim 1, wherein the video call comprises a video relay service (VRS) call or a direct video calling (DVC) call.

3. The method of claim 1, wherein enabling post-call redirection for the video call includes enabling a post-call redirection call parameter for the video call.

4. The method of claim 1, wherein redirecting the calling party to a post-call destination includes initiating a survey.

5. The method of claim 4, wherein the survey is presented to the calling party using an interactive sign language response (ISLR) system.

6. The method of claim 1, wherein redirecting the calling party to a post-call destination includes initiating a second video call.

7. A video calling system adapted for post-call redirection comprising:
   a computer processor coupled to a computer bus;
   a network adapter coupled to the computer bus, the network adapter adapted to send and receive data over a telecommunications network;
   a computer memory coupled to the computer bus, the computer memory programmed with computer-executable instructions that, when executed by the computer processor, cause the video calling system to perform the steps of:
   connecting a video call between at least two call participants, wherein at least one of the call participants is deaf, hard-of-hearing, or speech impaired;
   determining automatically by the video calling system without any input from any of the call participants whether post-call redirection should be enabled;
   upon determining by the video calling system that post-call redirection should be enabled, enabling post-call redirection for the video call;
   determining when the video call ends;

in response to determining that the video call has ended, redirecting the at least one of the call participants to a post-call destination; and wherein redirecting at least one of the call participants to a post-call destination further comprises redirecting at least one of the call participants to the post-call destination without any input from any of the call participants.

8. The system of claim 7, wherein the video call comprises a video relay service (VRS) call or a direct video calling (DVC) call.

9. The system of claim 7, wherein enabling post-call redirection for the video call includes enabling a post-call redirection call parameter for the video call.

10. The system of claim 7, wherein redirecting the calling party to a post-call destination includes initiating a survey.

11. The system of claim 10, wherein the survey is presented to the calling party using an interactive sign language response (ISLR) system.

12. The system of claim 7, wherein redirecting the calling party to a post-call destination includes initiating a second video call.

13. A non-transitory computer-readable medium encoded with computer instructions that, when executed by a computer processor of a video calling system, cause the video calling system to perform the steps of:

connecting a video call between at least two call participants, wherein at least one of the call participants is deaf, hard-of-hearing, or speech impaired;

determining automatically by the video calling system without any input from any of the call participants whether post-call redirection should be enabled;

upon determining by the video calling system that post-call redirection should be enabled, enabling post-call redirection for the video call;

determining when the video call ends;

in response to determining that the video call has ended, redirecting at least one of the call participants to a post-call destination; and wherein redirecting at least one of the call participants to a post-call destination further comprises redirecting at least one of the call participants to the post-call destination without any input from any of the call participants.

14. The non-transitory computer-readable medium of claim 13, wherein the video call comprises a video relay service (VRS) call or a direct video calling (DVC) call.

15. The non-transitory computer-readable medium of claim 13, wherein enabling post-call redirection for the video call includes enabling a post-call redirection call parameter for the video call.

16. The non-transitory computer-readable medium of claim 13, wherein redirecting the calling party to a post-call destination includes initiating a survey.

17. The non-transitory computer-readable medium of claim 16, wherein the survey is presented to the calling party using an interactive sign language response (ISLR) system.

18. The non-transitory computer-readable medium of claim 13, wherein redirecting the calling party to a post-call destination includes initiating a second video call.

* * * * *